July 7, 1925.
T. F. WILSON
1,544,711
AUTOMOBILE CRANK CASE MOUNTING
Filed May 29, 1920
2 Sheets-Sheet 1
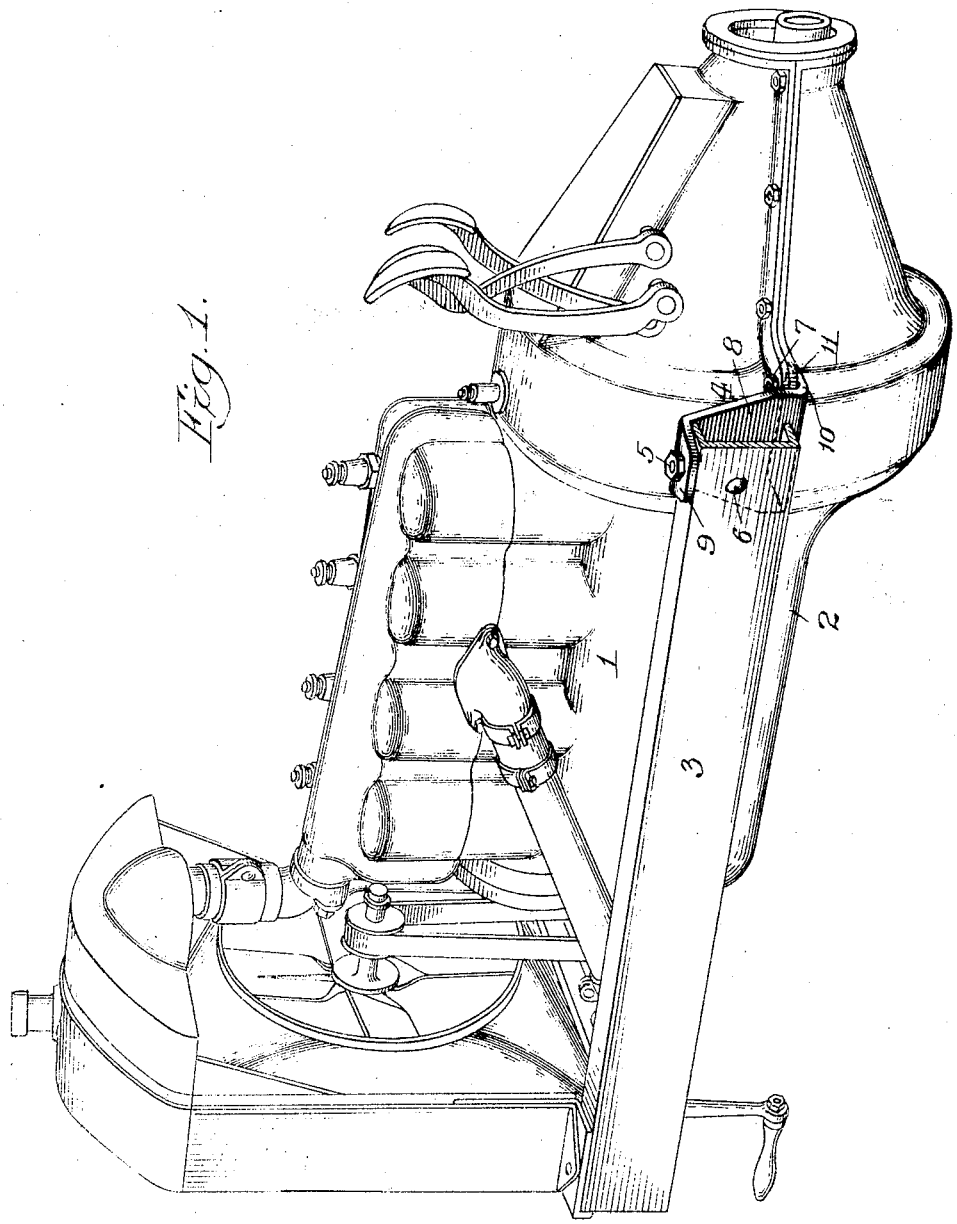
Witness
John Enders
Merrill M. Blackburn
Inventor:
Thomas F. Wilson,
by Wallace P. Lane
Atty.

July 7, 1925. 1,544,711
T. F. WILSON
AUTOMOBILE CRANK CASE MOUNTING
Filed May 29, 1920   2 Sheets-Sheet 2
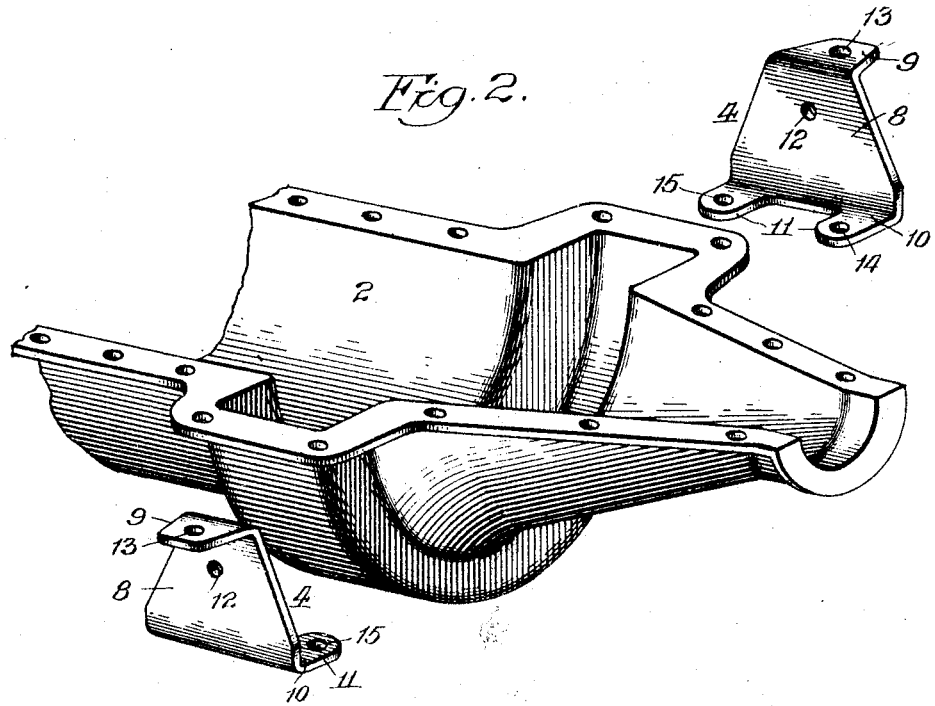
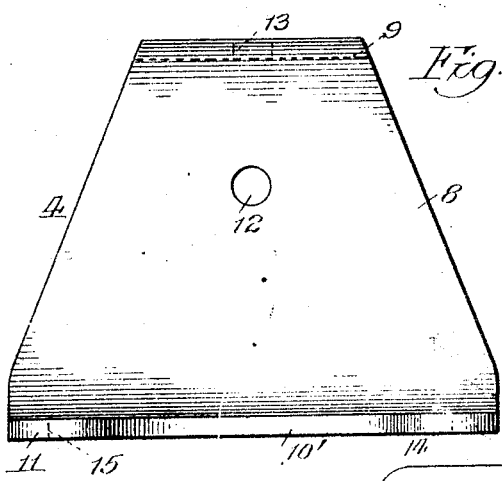
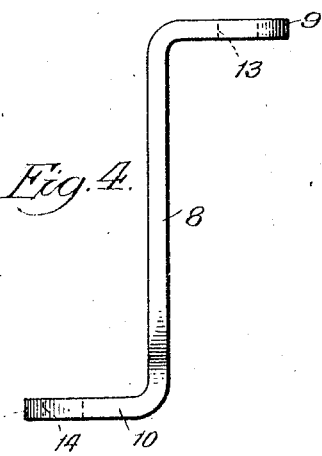
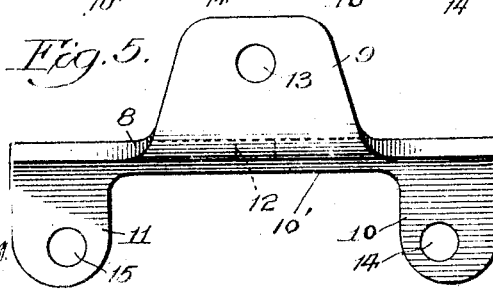
Witness:
John Enders
Merrill M. Blackburn
Inventor:
Thomas F. Wilson,
by Wallace R. Lane
Atty.

Patented July 7, 1925.

1,544,711

UNITED STATES PATENT OFFICE.

THOMAS F. WILSON, OF PROVIDENCE, RHODE ISLAND, ASSIGNOR TO APCO MANUFACTURING COMPANY, OF PROVIDENCE, RHODE ISLAND, A CORPORATION OF RHODE ISLAND.

AUTOMOBILE CRANK-CASE MOUNTING.

Application filed May 29, 1920. Serial No. 385,180.

*To all whom it may concern:*

Be it known that I, THOMAS F. WILSON, a citizen of the United States, residing at Providence, in the county of Providence and State of Rhode Island, have invented certain new and useful Improvements in Automobile Crank-Case Mounting, of which the following is a specification.

This invention relates to means for mounting the crank case of an automobile engine in position in the machine.

It frequently happens that, on account of breakage or for other reasons it becomes necessary to have a supporting member capable of quick and ready application whereby the engine can be temporarily, or permanently, if desired, supported upon the frame of the automobile. This I have made possible by the present invention comprising the bracket and the combination of the same with the automobile frame and crank casing as shown in the annexed drawing.

Among the objects of my invention are to produce a bracket capable of being quickly and readily combined with the automobile frame and crank casing to support the latter upon the former; to produce a bracket which can be applied with rapidity, ease and effectiveness between the frame and crank casing and constructed to substantially instantly match up with the co-operating parts; further to provide such brackets that they will be instantly available without long delays requiring the forging or making of new parts; further to provide a combination of crank case, frame and repair arm so that the original strength can be quickly secured in repairing: and such further objects, advantages and capabilities as will later more fully appear.

My invention further resides in the combination, construction, and arrangement of parts illustrated in the accompanying drawings, and while I have shown therein a preferred embodiment I desire the same to be understood as illustrative only and not as limiting my invention.

In the accompanying drawings forming a part hereof and to which reference will now be made, Fig. 1 is a perspective view of an automobile engine and a part of the frame, connected by the repair bracket; Fig. 2 is a perspective view of a portion of the crank case of an engine and a pair of brackets about to be applied thereto; Figs. 3, 4 and 5 are respectively elevation, end view, and plan of the bracket.

Referring more in detail to the drawings numeral 1 represents the engine, 2 the crank case of the engine and 3 one of the side members of the automobile frame, while 4 refers to the bracket, which is secured to frame member 3 by means of bolts 5 and 6 and to the crank case by means of bolts 7. The bracket comprises the body member 8 and the lateral arms 9, 10 and 11, the body being provided with a bolt aperture 12, arm 9 with an aperture 13 and arms 10 and 11 with apertures 14 and 15. Between the arms 10 and 11 also extends an integral narrow flange portion 10' which is also integral with the body 8 and extending laterally therefrom.

In carrying out my invention the bracket 4 is inserted between the crank case 2 and the frame member 3 with the arm 9 resting upon the latter member and the arms 10 and 11 together with flange 10' beneath the flange of the crank case. After this bolts 5, 6 and 7 are put in place and the nuts screwed thereupon. It is to be noted that apertures 14 and 15 are so positioned as to exactly register with the adjacent openings of the crank case at the portion where it is to be applied; while aperture 13 registers with an opening in the frame. This construction enables the instant application of the arm or bracket into position to effectively and easily secure the crank case to the frame as soon as the original broken part has been removed.

This bracket is especially advantageous in repair work since, if one is handy, it is an easy matter to remove the bolts from the flange of the crank case, place a bracket in position, and insert bolts to fasten the same in place.

Having now described my invention, I claim:

1. An automobile repair bracket comprising a body having an integral offset upper arm and integral lower arms also offset from the body but in a direction opposite to the offset of the upper arm, said body and said arms being perforated to receive bolts, the lower edge of said body also having an offset located between and connected with said lower arms.

2. In a motor vehicle construction, the combination of a frame member, a flanged power plant housing portion, and a repair bracket comprising a body having an integral offset upper arm secured to said member and integral lower arms offset from said body in a direction opposite to the offset of the upper arm and being secured to said housing portion, said body and said arms being perforated to receive securing elements, the lower edge of said body also having an offset located between and connected with said lower arms.

3. An automobile repair bracket comprising a body having an offset upper arm, and offset spaced apart lower arms, the lower edge of said body having an offset integral reinforcing flange which is also integral with said lower arms and in approximately the same plane therewith.

4. An automobile repair bracket comprising a body having laterally extended integral supporting arms at one edge, said edge also having a correspondingly offset integral flange which is also integral with said arms and approximately in the same plane therewith.

5. An automobile repair bracket comprising a body, laterally extending supporting arms, and an angle portion rigid with said arms and said body for increasing the supporting strength of said arms.

6. In a motor vehicle construction, the combination of a chassis frame member, a flanged power plant housing portion, and a repair bracket connected to and between said member and said housing portion and comprising a body having laterally extending integral supporting arms at one edge thereof, said edge also having a corresponding offset integral flange which is also integral with said arms and approximately in the same plane thereof.

In witness whereof, I hereunto subscribe my name to this specification.

THOMAS F. WILSON.